US012115533B2

(12) United States Patent
Evander et al.

(10) Patent No.: US 12,115,533 B2
(45) Date of Patent: Oct. 15, 2024

(54) ACOUSTOFLUIDIC DEVICE CONFIGURED FOR ALLOWING RESONANCE FREQUENCY TRACKING AND METHODS THEREFOR

(71) Applicant: ACOUSORT AB, Lund (SE)

(72) Inventors: Mikael Evander, Furulund (SE); Magnus Hivert, Lund (SE)

(73) Assignee: ACOUSORT AB, Lund (SE)

( * ) Notice: Subject to any disclaimer, the term of this patent is extended or adjusted under 35 U.S.C. 154(b) by 0 days.

(21) Appl. No.: 18/520,160

(22) Filed: Nov. 27, 2023

(65) Prior Publication Data

US 2024/0100521 A1 Mar. 28, 2024

Related U.S. Application Data

(63) Continuation of application No. PCT/EP2022/065892, filed on Jun. 10, 2022.

(30) Foreign Application Priority Data

Jun. 11, 2021 (EP) .................................. 21179158

(51) Int. Cl.
*B01L 3/00* (2006.01)
*G10K 11/04* (2006.01)

(52) U.S. Cl.
CPC ........ *B01L 3/502761* (2013.01); *G10K 11/04* (2013.01); *B01L 2400/0439* (2013.01)

(58) Field of Classification Search
CPC ....... B01L 3/502761; B01L 2400/0439; G10K 11/04
See application file for complete search history.

(56) References Cited

U.S. PATENT DOCUMENTS 9,670,477 B2 * 6/2017 Lipkens .............. A61M 1/3678
2009/0052273 A1 * 2/2009 Sarvazyan ............. B01F 31/87
366/116

FOREIGN PATENT DOCUMENTS

CN 2064994 A1 * 6/2009 ............. G01N 29/24
EP 3614136 A1 2/2020
(Continued)

OTHER PUBLICATIONS

Dual, Jürg et al, Acoustofluidics 6: "Experimental Characterization of Ultrasonic Particle Manipulation Devices", Lab on a Chip, vol. 12, No. 5, Jan. 1, 2012.
(Continued)

*Primary Examiner* — Forrest M Phillips
(74) *Attorney, Agent, or Firm* — Shore IP Group, PLLC; Howard J. Klein

(57) ABSTRACT

An acoustofluidic device includes a substrate and an ultrasound transducer contacting the substrate. The substrate and the transducer combined have a set of acoustic natural system resonances determined by the material and the dimensions of the substrate and the transducer. Each system resonance has a resonance frequency and a resonance quality factor. A microfluidic cavity is provided in the substrate to contain a fluid, the cavity having a set of acoustic natural cavity resonances, each having a resonance frequency and a resonance quality factor, determined by the dimensions of the cavity and the speed of sound in a fluid to be contained in the cavity. The material and the dimensions of the substrate and the transducer are selected so that at least one individual cavity resonance has a resonance frequency corresponding to the frequency of a minimum in an impedance spectrum of the transducer.

20 Claims, 5 Drawing Sheets

(56) References Cited

FOREIGN PATENT DOCUMENTS

Figure 1A:
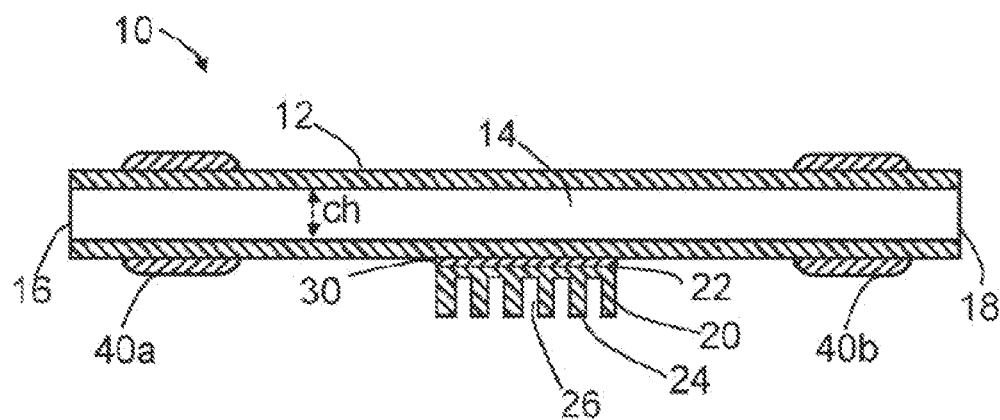

| WO | WO-2004111629 A1 | * | 12/2004 | ............. G01N 29/02 |
| WO | WO-2018065626 A1 | * | 4/2018 | ................ B01L 3/00 |
| WO | WO-2019043198 A1 | * | 3/2019 | ................ B01L 3/00 |

OTHER PUBLICATIONS

Hammarstroem et al, "Frequency Tracking in Acoustic Trapping for Improved Performance Stability and System Surveillance", Lab on a Chip, vol. 14, No. 5, Jan. 1, 2014.
Lickert, Fabian et al, "Acoustophoresis in Polymer-based Microfluid Devices: Modeling and Experimental Validation", Arxiv.Org, Cornell University Library 201, Jul. 29, 2021.
Mueller, A. et al, "Continuous Acoustic Separation in a Thermoplastic Micro-Channel", Journal of Micromechanics and Microengineering, Institute of Physics Publishing, GB, vol. 23, No. 12, Oct. 30, 2013.

* cited by examiner

ACOUSTOFLUIDIC DEVICE CONFIGURED FOR ALLOWING RESONANCE FREQUENCY TRACKING AND METHODS THEREFOR

CROSS-REFERENCE TO RELATED APPLICATIONS

This application is a continuation of International Application No. PCT/EP2022/065892, filed Jun. 10, 2022, the subject matter of which is incorporated herein by reference in its entirety. International Application No. PCT/EP2022/065892 claims priority from European Application No. 21179158.7, filed Jun. 11, 2021.

TECHNICAL FIELD

The technology proposed herein relates generally to the field of acoustofluidic devices and systems and methods of handling or separating particles or cells in such devices. More particularly the technology proposed herein concerns acoustofluidic devices configured for allowing resonance frequency tracking during use, i.e., so that the resonance frequency can be tracked and the actuation frequency of the ultrasound transducer of the acoustofluidic device adjusted for efficient use of the ultrasound energy.

BACKGROUND

Acoustofluidic devices and systems include microfluidic acoustofluidic chips comprising acoustofluidic, e.g., microfluidic, cavities such as channels in which a sample fluid can be processed by performing an acoustofluidic operation on the sample fluid. During the acoustofluidic operation ultrasound energy is supplied to the acoustofluidic device including any microfluidic channel or cavity to affect the sample fluid and any particles suspended in the sample fluid. The acoustofluidic operation may be one of separation, i.e., affecting movement of the particles in the sample fluid so that different particles travel different distances in the fluid as a function of how each particle is affected by the ultrasound energy being supplied to the acoustofluidic device. By suitable design of the microfluidic channels or cavities, together with suitable selection of laminar flow of the sample or no-flow conditions, different particles can be moved to different positions and thereafter separated from each other. Other acoustofluidic operations involve driving particles in the sample fluid towards a position, such as the center or walls, of the microfluidic channels or cavities. Still further acoustofluidic concerns holding or trapping selected particles in specific positions against flow of the suspending medium, thus for example allowing the suspending medium being replaced by another medium.

Efficient performance of an acoustofluidic operation however requires that the frequency of the ultrasound energy supplied to the acoustofluidic device is selected, i.e., tuned, so that a resonance or standing wave arises in the microfluidic channels or cavities. Thus, the operation frequency, i.e., the frequency of the supplied or applied ultrasound, should match the resonance frequency of the microfluidic channels or cavities.

More specifically, in order to be able to move and spatially localize particles in the fluid sample, resonance must occur in the dimension of the channel or cavity in which the particle is to be moved, e.g., over the width of the channel, over the height of the channel, or both. Typically, the cavity dimension of interest must support an integer number of half wavelengths in the fluid sample, i.e., in the fluid in which the particle is suspended in, thus allowing the formation of an acoustic standing wave with well-defined nodes and antinodes. In resonance conditions, particles inside the cavity are affected by acoustic radiation forces that move them towards particular locations or regions in the cavity depending on their acoustophysical properties e.g., density and compressibility. In this way, different particles/cells can be separated or aggregated. Acoustofluidic operations can be performed during flow of the fluid sample, or in conditions of no flow of the fluid sample.

However, even where the dimensions of the channel or cavity are known, the one-dimensional standing planar acoustic wave approximation, which is often used in design purposes, is not sufficient to precisely determine the acoustic resonance frequency of the channel or cavity in an acoustofluidic device. Thus, even if the width of the channel is a multiple of the wavelength of the ultrasound and the resonance (acoustic standing wave) is expected to occur for a specific frequency corresponding to this width, the actual or optimum operation frequency is typically achieved at a different frequency.

Furthermore, the desire to obtain an efficient acoustofluidic operation compounds the problem with finding the correct resonance frequency. By using low attenuating materials with high speed of sound, such as glass or silicon, and well-matched ultrasound transducers, acoustofluidic devices can be obtained that have a high Q-factor. The Q-factor is a parameter that describes how underdamped a resonator is. Accordingly, a high Q factor indicates a system with low rate of energy loss. For an acoustofluidic device, a high Q-factor implies that acoustic energy is efficiently accumulated in the system. Such a device will provide good performance in terms of sample throughput without introducing excessive heating of the device.

However, any measure taken to create an acoustofluidic device with a high Q-factor will simultaneously narrow the frequency range (decrease the bandwidth) in which the device can be operated. An acoustofluidic device with a high Q-factor is thus sensitive to the properties of the fluid in the cavity, and other operation conditions such as temperature which may affect the resonance frequency. Changes in these parameters may lead to unexpected shifts in the resonance frequency of the device whereby the force on the particles and fluid varies so that the desired effect, i.e., trapping or movement of particles, is lost.

This may prevent the use of an acoustofluidic device for different fluids or uses, because the most efficient operation frequency used for one specific fluid or use may prove inefficient for another fluid or use.

Due to the above phenomena, channel or cavity resonance frequency are nowadays commonly found experimentally by visual inspection of particle band formation (in a fluid sample) while manually scanning the frequency over a frequency range encompassing the expected resonance frequency. This method is operator dependent and requires access to costly equipment such as a function generator and microscope. This method is further less precise, time consuming, and may be irreproducible. These are factors which further prevent the simplifying and commercializing acoustofluidic devices for a general user.

One attempt to provide an automatic method for determining a suitable resonance frequency involves measuring the electrical impedance of a piezoelectric transducer which transforms the electric drive signal into the ultrasound energy supplied to the acoustofluidic device.

As an example of this approach, J Dual, P Hahn, I Leibacher, D Möller, and T Schwarz. Acoustofluidics 6: Experimental characterization of ultrasonic particle manipulation devices. Lab on a Chip, 12(5):852{862, 2012, suggests measuring the electrical impedance to characterize ultrasonic systems and to find resonance frequencies. Further, Hammarström, M Evander, J Wahlström, and J Nilsson. Frequency tracking in acoustic trapping for improved performance stability and system surveillance. Lab on a Chip, 14(5):1005{1013, 2014, managed to frequency track a pre-annotated impedance minimum when actuating a simple glass capillary, resulting in efficient acoustic trapping.

These approaches are however not able to successfully track and tune the operating frequency in an arbitrary acoustofluidic device, or they are complex and/or require pre-annotation, i.e., prior knowledge, of the impedance feature to track.

Further, these approaches in some cases use a fluid layer as a coupling material between the ultrasound transducer and the substrate in order to decrease the transmission of unwanted vibrations (due to internal resonance in the transducer) from the transducer to the substrate. Such a fluid layer may be acceptable for acoustofluidic devices used in a laboratory or for research, but is less suitable, due to the transient nature of the fluid layer, for commercial implementation of acoustofluidic devices.

OBJECTS

Objects of the technology proposed herein include the provision of acoustofluidic devices configured for allowing resonance frequency tracking. Such devices, by their configuration, i.e., structure, decreases the difficulty of identifying impedance features and therefore allow simpler and/or more robust methods of resonance frequency tracking. Other objects of the technology proposed herein include the provision of methods of performing resonance frequency tracking as well as methods of performing acoustofluidic operations involving resonance frequency tracking.

SUMMARY

At least one of the abovementioned objects, or at least one of the further objects which will become evident from the below description, are according to a first aspect of the technology proposed herein obtained by an acoustofluidic device comprising:
  a substrate, and
  an ultrasound transducer attached to, or in contact with, the substrate, wherein the substrate and the ultrasound transducer combined have a first set of acoustic natural system resonances determined by the material and the dimensions of the substrate and the material and the dimensions of the ultrasound transducer, each system resonance comprising a resonance frequency and a resonance quality factor,
and
  a microfluidic cavity, such as a microfluidic channel, provided in the substrate and containing a fluid, the microfluidic cavity having a second set of acoustic natural cavity resonances determined by the dimensions of the cavity and the speed of sound in the fluid, each cavity resonance comprising a resonance frequency and a resonance quality factor,
wherein the material and the dimensions of the substrate and the material and the dimensions of the ultrasound transducer are all selected so that at least one individual cavity resonance of the second set of acoustic natural cavity resonances has a resonance frequency corresponding to the frequency of a minimum, preferably a local minimum, more preferably a global minimum, in an impedance spectrum of the ultrasound transducer attached to, or in contact with, the substrate.

Accordingly, the present inventors have found that it is indeed possible to perform resonance frequency tracking in acoustofluidic devices even where the ultrasound transducer is attached to or in contact with the substrate, i.e., without the use of a coupling material such as a fluid layer between the ultrasound transducer and the substrate, provided that at least one individual cavity resonance of the second set of acoustic natural cavity resonances has a resonance frequency corresponding to the frequency of a minimum in an impedance spectrum of the ultrasound transducer. Accordingly, there is no fluid layer, such as glycerol, between the ultrasound transducer and the substrate.

The acoustofluidic device may for example be used for an acoustic operation such as any of mixing of fluids with or without particles and/or molecules, sorting of particles and/or molecules, separation of particles and/or molecules, etc.

The substrate may be made of silicon but may be made of polymeric material such as plastic, or alternatively glass. Also, other materials such as ceramics and metals are possible. The substrate may be planar, such as a chip, or alternatively the substrate may be formed as a capillary having a round or rectangular cross section.

The microfluidic cavity is preferably a channel having a square or rectangular cross section. The microfluidic cavity may for example have a cross sectional width of 1 to 10 times, such as 1 to 2 times the cross-sectional height. In this case the length of the microfluidic cavity is at least the same as the width, but preferably many times longer. The width may for example be from 0.15 mm to 2, or 0.15 to 1 mm. The height may for example be from 0.1 mm to 5 mm.

Preferably the substrate is elongated, and the microfluidic cavity is a channel extending along at least a majority of the length of the substrate. This is advantageous as such substrates are very suitable for acoustofluidic devices. The channel preferably has a rectangular cross section with a width that is a at least 2 times the height. Most preferably the substrate is a capillary having a channel with a height of 0.1 to 5 mm and a width of 1 to 10 mm.

The microfluidic cavity is provided in the substrate. The substrate may be made of two parts with a base substrate, a groove formed in the top surface of the base substrate and defining the microfluidic cavity, and a lid substrate positioned on top of the top surface of the base substrate to close the microfluidic cavity.

A fluid may be provided or contained in the cavity. The fluid may be stationary or may be caused to flow through the cavity. The flow may be generated by pumping, by pressure, by suction, by the action of electrical fields, by gravity, and by capillary action. The cavity may be fluidly connected to an inlet, through which the fluid is introduced into the cavity, and fluidly connected to an outlet, through which the fluid leaves the cavity. More than one outlet may be fluidly connected to the cavity in order to lead off different parts of the fluid to different outlets. Also, more than one inlet may be provided for allowing different sample fluids, other fluids, particles and/or reagents to be introduced into the cavity. The fluid may include plasma, water, urine, yeast cell broth, cell culture medium, saline solutions, phosphate buffered saline, interstitial fluid, milk, blood plasma, etc. Where the fluid comprises particles, the particles may comprise red blood cells, white blood cells, platelets, cancer cells, circulating tumor cells, bacterial cells, viruses, yeast cells, fat cells, exosomes, extracellular vesicles, microvesicles, lipoproteins, dust particles, silica particles and polymer particles. The fluid may be positioned in the cavity by pumping, by pressure, by suction, by the action of electrical fields, by gravity, and/or by capillary action.

The ultrasound transducer is preferably rectangular or square with the first and second sides being parallel. The ultrasound transducer is preferably a piezoelectric or electrostrictive transducer. The ultrasound transducer may be driven, e.g., actuated, by a periodic signal having a frequency f and an amplitude defined by the voltage minimum to maximum (Vpp). Where the ultrasound transducer is driven over a range of frequencies to obtain an impedance spectrum, the Vpp may for example be at least 1 Vpp. In such cases the range of frequencies may for example comprise an array of a finite number of frequencies starting at a start frequency, increasing by a frequency step, and ending at an end frequency, or alternatively a continuous frequency sweep. The ultrasound transducer is preferably driven to provide an acoustic standing wave in at least one dimension of the cavity.

The ultrasound transducer is attached to, or in contact with, the substrate. This means that there is no fluid or gel coupling layer between the ultrasound transducer and the substrate. Preferably the ultrasound transducer is attached to the substrate by an adhesive.

The substrate and the ultrasound transducer combined have a first set of acoustic natural system resonances. Specifically, the substrate has a first set of acoustic natural substrate resonances determined by the material and dimensions of the substrate, each substrate resonance comprising a resonance frequency and a resonance quality factor. Further, the ultrasound transducer has a first set of acoustic natural transducer resonances determined by the material and dimension of the substrate, each transducer resonance comprising a resonance frequency and a resonance quality factor.

The first set of acoustic natural system resonances is obtained as the ultrasound transducer is attached to, or put in contact with, the substrate and thus comprises the natural resonances of the system of substrate and ultrasound transducer.

The first set of acoustic natural system resonances may comprise resonance in one or more of the dimensions length, width, height, and volume of the system of substrate and ultrasound transducer. Generally, resonance may occur when a dimension supports or corresponds to an integer number of half wavelengths of a vibration (ultrasound) applied to the system of substrate and ultrasound transducer.

Each system resonance comprises a resonance frequency and a resonance quality factor. The resonance frequency is the frequency at which the system resonance is obtained, and the resonance quality factor is a measure of how underdamped the system is at the specific resonance.

The microfluidic cavity has a second set of acoustic natural cavity resonances determined by the dimensions of the cavity and the speed of sound in the fluid. The second set of acoustic natural cavity resonances may comprise resonance in one or more of the dimensions length, width, and height of the cavity. Generally, resonance may occur when a cavity dimension supports or corresponds to an integer number of half wavelengths of a vibration (ultrasound) applied to the cavity and the fluid therein.

Each cavity resonance comprising a resonance frequency and a resonance quality factor. The resonance frequency is the frequency at which the cavity resonance is obtained, and the resonance quality factor is a measure of how underdamped the cavity is at the specific resonance.

In order to perform resonance frequency tracking of the resonance frequency of the microfluidic cavity, i.e., where a resonance and the corresponding acoustic standing has an acoustofluidic effect on the fluid and any particles, it must be possible to detect this resonance and its resonance frequency among all other resonances of the system.

As surprisingly found by the present inventors, this is indeed possible even if the ultrasound transducer is attached or in contact with the substrate, i.e., there being no fluid (or gel) coupling layer therebetween.

Accordingly, it is indeed possible to select the material and the dimensions of the substrate and the material and the dimensions of the ultrasound transducer such that at least one individual cavity resonance of the second set of acoustic natural cavity resonances has a resonance frequency corresponding to the frequency of a minimum, preferably a local minimum, more preferably a global minimum impedance spectrum of the ultrasound transducer.

In other words, the material and dimensions of the substrate and ultrasound transducer can be selected so that at least one cavity resonance can be detected among all other resonances of the system. Accordingly, an impedance spectrum obtained by driving the ultrasound transducer of such an acoustofluidic device over a range of frequencies will show a minimum, such as a local minimum or preferably a global minimum, that corresponds to the resonance frequency of the at least one cavity resonance.

Typically, the microfluidic cavity has a length dimension, a width dimension, and a height dimension, and wherein the second set of cavity resonances includes a resonance in at least one of the length dimension, width dimension, and height dimension, such as in the width and/or height dimension.

Preferably the microfluidic cavity is shaped as a channel having a width, a height, and a length.

There are several ways in which the at least individual cavity resonance can provide a minimum in the impedance spectrum.

Preferably at least one individual cavity resonance of the second set of acoustic natural cavity resonances has:
  a resonance frequency that is different from the resonance frequencies of the first set of acoustic natural system resonances, and/or
  a resonance quality factor that is larger than the resonance quality factor of the system resonance, of the first set of acoustic natural system resonances, that has the closest resonance frequency to the resonance frequency of the at least one individual cavity resonance, and preferably,
  a resonance quality factor that is larger than the resonance quality factors of each of the system resonances of the first set of acoustic natural system resonances.

For example, when the individual cavity resonance has a larger resonance quality factor than the resonance quality factors of the system resonances, then vibration energy supplied by the ultrasound is more efficiently accumulated as an acoustic standing wave in the cavity and fluid, than as an acoustic standing waves in the substrate and in the ultrasound transducer. Preferably the material and the dimensions of the substrate and the material and the dimensions of the ultrasound transducer are all configured so that the resonance quality factor of the at least one individual cavity resonance is at least 25%, such as at least 50%, such as at least 100%, such as at least 200%, such as at least 400% larger in these cases.

Where the at least one individual cavity resonance of the second set of acoustic natural cavity resonances has a resonance frequency that is different from the resonance frequencies of the first set of acoustic natural system resonances, the difference is preferably at least 2.5%, more preferably at least 3.5%, of, preferably each of, the resonance frequencies of the first set of acoustic natural transducer resonances. As discussed with reference to the description of FIGS. 3A-C and 4A-B further below, a 2.5% difference between cavity resonance and transducer resonance (which heavily influences the system resonances) allowed tracking where a difference of 1.65 or 1.5% did not. Preferably the difference of at least 2.5% is less than 150%, such as less than, 100%, such as less than 75%, for example less than 50%, preferably less than 25%, more preferably less than 10%, of, preferably each of, the resonance frequencies of the first set of acoustic natural transducer resonances. In other words the difference may thus be 2.5%-150%, 2.5%-100%, preferably 2.5%-75%, for example 2.5%-50%, preferably 2.5%-25%, more preferably 2.5%-10%, of, preferably each of, the resonance frequencies of the first set of acoustic natural transducer resonances.

Preferably the acoustofluidic device is configured for decreasing the resonance quality factor of at least one resonance of the first set of acoustic natural system resonances, to thereby dampen or remove at least one resonance of the first set of acoustic natural system resonances.

This is preferred as it allows the minimum of the at least one individual cavity resonance to be more easily detected in the impedance spectrum.

Accordingly, the acoustofluidic device may be provided with:
a dampening material provided in contact with at least a part of the substrate and configured for decreasing the resonance quality factor of at least one resonance of the first set of acoustic natural system resonances, to thereby dampen or remove at least one resonance of the first set of acoustic natural system resonances, the dampening material preferably comprising a dimensionally stable polymeric material such as a cured adhesive, a rubber, a silicone, or a polyurethane.

Without wishing to be bound by theory it appears that a dampening material allows for primary ultrasound vibrations from the ultrasound transducer to be efficiently transferred into the substrate and the microfluidic cavity and provide ultrasound vibrations in the cavity, while at the same time secondary vibrations, arising from all other possible resonances within the remainder of the substrate are more or less selectively dampened by the dampening material.

The dampening material is in contact with at least a part of the substrate. The dampening material may be in contact with at least a part of the substrate by being attached to at least part of the substrate. The dampening material may be provided continuously or discontinuously over the substrate, but it is preferred that no dampening material is provided to the substrate at, or opposite from, where the ultrasound transducer is in contact with the substrate.

Multiple dampening materials or pieces of dampening materials may be used/positioned in contact with the substrate.

Preferably the dampening material comprises a dimensionally stable polymeric material, preferably a cured adhesive, a rubber, a silicone, or a polyurethane. Such dampening materials are advantageous in that they inter alia can be applied to the substrate by molding and/or curing. The dampening material should be capable of dampening ultrasound energy, i.e., ultrasound vibration of the substrate. The amount of dampening material should be configured so that a suitable dampening of the ultrasound energy is obtained.

Preferably the dampening material is a cured adhesive. The cured Shore A hardness of the adhesive is preferably from 65 to 85, more preferably the cured shore D hardness is from 80 to 90, such as 85.

Preferably the dampening material encircles the substrate. This is advantageous in that it ensures dampening of vibrations in more than one dimension, while also providing a physical protection of the substrate. The dampening material may for example be provided as one or more collars of dampening material placed around the substrate. For an elongated substrate, such as a capillary, the dampening material may thus be provided as one or more collars provided at one or more longitudinal positions along the substrate and encircling the substrate. The dampening material may for example be provided as first and second collars encircling the substrate and positioned at first and second longitudinal positions bracketing the longitudinal position at which the ultrasound transducer is positioned. In other words, the dampening material is provided on both sides of the position of the ultrasound transducer on the substrate. The distance between dampening material and the ultrasound transducer may be at least 0.1 mm.

Alternatively, or additionally, the acoustofluidic device further comprises:
a support surface, such as a printed circuit board, wherein the ultrasound transducer is attached to the support surface via at least a part of the second side, and/or
at least a portion of the second side of the ultrasound transducer is not in electrical or physical contact with the support surface, and/or
at least a part of the dampening material is in contact with the support surface.

This is advantageous in that it allows further components of the acoustofluidic device, such as for example a drive circuit for driving the ultrasound transducer, or a detector device for detecting or imaging the cavity, to be mounted in the vicinity of the ultrasound transducer, and hence in the vicinity of the substrate. The term printed circuit board (PCB) is intended in encompass any planar support or substrate on which electronic, optical and/or fluidic components. can be mounted.

The support surface may be cooled to cool the ultrasound transducer.

It is preferred that at least a portion of the second side of the ultrasound transducer is not in electrical or physical contact with the support surface because this lessens the amount of ultrasound energy that is transferred to the support surface from the ultrasound transducer, and thus lessens ultrasound vibrations due to resonance in the support surface. Preferably the support surface comprises a cutout or depression beneath at least a part of the second side of the ultrasound transducer, such that said part of the second side of the ultrasound transducer is not in electrical or physical contact with the support surface.

It is further preferred that at least a part of the dampening material is in contact with the support surface because this increases the efficiency of the dampening material in dampening vibrations of the substrate and the acoustofluidic device. This is also advantageous in that it protects the substrate from physical damage as the substrate is supported by the support surface via the dampening material. The dampening material may for example be encircling the substrate, such as for example as one or more collars of which one side contacts the Support surface. Alternatively, the dampening material may be provided only on the side of the substrate that faces the support surface, e.g., as a bead or filler filling out the space between the substrate and the support surface. Preferable the dampening material is in contact with the support surface by being attached to the support surface, for example by being adhered to or bonded to the support surface.

Alternatively or additionally, the ultrasound transducer has a height dimension extending from a first side attached to the substrate to an opposite second side, and wherein the ultrasound transducer is configured such that the resonance quality factor for at least one resonance in the height dimension is larger than the resonance quality factor for at least one resonance in one of a width dimension and a length dimension, each of the width dimension and length dimension being perpendicular to the height dimension and to each other, wherein preferably the second side of the ultrasound transducer is provided with a plurality of spaced apart parallel grooves for reducing the resonance quality factor for at least one resonance in the width dimension and/or the length dimension.

This is advantageous in that it decreases the strength and number of system resonances.

The grooves are preferably arranged at regular intervals on the second side of the ultrasound transducer. Typically, the width of each groove is smaller than the distance between two neighboring grooves. The depth of the grooves is preferably 60% to, 95% of the distance between the first and second side of the ultrasound transducer.

The ultrasound transducer is preferably configured and attached to the substrate so that the grooves run transverse to the longest dimension of the microfluidic cavity. Thus, where the microfluidic cavity is a channel, the grooves preferably run at a 90-degree angle to the longitudinal direction of the channel.

The first side of the ultrasound transducer may advantageously be dimensioned that a part of the first side is not attached to the substrate. This may be advantageous as it provides space for attaching one or more of the leads needed for delivering an electric drive signal to the ultrasound transducer.

The ultrasound transducer may be configured so that the grooves run parallel or orthogonal to the longest dimension of the transducer.

Additionally or alternatively, the ultrasound transducer is attached to the substrate via an adhesive layer, the adhesive layer preferably having a thickness of 200 μm or less, such as 100 μm or less.

The material and dimensions of the adhesive layer should be selected so at to not dampen the second set of resonances.

The adhesive layer has a thickness of 200 μm or less. Preferably the adhesive layer has a thickness of 150 μm or less. More preferably the adhesive layer has a thickness of 100 μm or less. The adhesive layer is preferably made up of a cured adhesive but may alternatively be made up of a solid adhesive sheet, such as a double-sided tape. A cured adhesive is advantageous for acoustofluidic devices where the ultrasound transducer need not be separated from the substrate but bound to it permanently, whereas a solid adhesive sheet is advantageous where it is desired that the ultrasound transducer should be separable from the substrate. Preferably the adhesive layer is formed of an adhesive having a cured Shore hardness of at least 55D, and preferably at the most 85D. Suitable adhesives for forming the adhesive layer include heat curable epoxy adhesives, cyanoacrylate adhesives, methacrylate adhesives, and UV-curable acrylic adhesives.

It is especially preferred when the acoustofluidic device comprises the dampening material and the second side of the ultrasound transducer is provided with the plurality of spaced apart parallel grooves. It is even more preferred when additionally the ultrasound transducer is attached to the substrate via an adhesive layer having a thickness of 200 μm or less, such as 100 μm or less. Specifically, the combination of an adhesive layer having a thickness of 200 urn or less, and a dampening material in contact with at least a part of the substrate, ensures efficient transfer of ultrasound energy into the substrate while at the same time allowing some of that ultrasound energy to be siphoned off, i.e., dampened. This, when combined with an ultrasound transducer having its second side provided with a plurality of spaced apart parallel grooves, provides an impedance spectrum (obtained by measuring the electrical impedance of the ultrasound transducer as the transducer is driven at a range of frequencies) with reduced noise and in which the impedance minimum associated with a resonance frequency of the cavity is more easily discernible, thus allowing it to be robustly identified and the actuation frequency of the ultrasound transducer can be adjusted to the resonance frequency for efficient use of the ultrasound energy.

Preferably, the transducer has a third set of acoustic natural transducer resonances determined by the material and dimension of the ultrasound transducer material, each transducer resonance comprising a resonance frequency and a resonance quality factor, and wherein at least one individual cavity resonance of the second set of acoustic natural cavity resonances has a resonance frequency that is different from the resonance frequencies of the third set of acoustic natural transducer resonances.

This corresponds to actuating the ultrasound transducer at a frequency that is not one of the resonance frequencies of the ultrasound transducer. This is advantageous in that it significantly decreases the resonances of the ultrasound transducer.

Preferably, the difference between the resonance frequency of the at least one individual cavity resonance of the second set of acoustic natural cavity resonances and the resonance frequencies of the third set of acoustic natural transducer resonances is at least 2.5%, more preferably at least 3.5%, of, preferably each of, the resonance frequencies of the third set of acoustic natural transducer resonances. As discussed with reference to the description of FIGS. 3A-C and 4A-B further below, a 2.5% difference allowed tracking where a difference of 1.65 or 1.5% did not.

Preferably the difference of at least 2.5% is less than 150%, such as less than, 100%, such as less than 75%, for example less than 50%, preferably less than 25%, more preferably less than 10%, of preferably each of, the resonance frequencies of the third set of acoustic natural transducer resonances. In other words the difference may thus be 2.5%-150%, 2.5%-100%, preferably 2.5%-75%, for example 2.5%-50%, preferably 2.5%-25%, more preferably 2.5%-10%, of, preferably each of, the resonance frequencies of the third set of acoustic natural transducer resonances.

Additionally or alternatively, the difference between the resonance frequency of the at least one individual cavity resonance of the second set of acoustic natural cavity resonances and the resonance frequencies of the third set of acoustic natural transducer resonances is preferably at least 0.05 MHz, more preferably at least 0.1 MHz.

Thus, where the ultrasound transducer has a resonance frequency of for example 2 MHz, then the acoustofluidic device may be configured so that at least one cavity resonance, as determined by the dimension of the cavity and the fluid in the cavity, differs at least by 2.5%, such by being 2.05 MHz or higher, or 1.95 MHz or lower.

Further, if the ultrasound transducer has resonance frequencies of for example 2 MHz and 2.5 MHz, then the acoustofluidic device may be configured so that at least one cavity resonance, as determined by the dimension of the cavity and the fluid in the cavity, differs at least by 2.5%, such by being 0.05 MHz or higher or lower than 2 MHz and at least 2.5%, such as by being 0.0625 MHz higher or lower than 2.5 MHz.

At least one of the abovementioned objects, or at least one of the further objects which will become evident from the below description, are according to a second aspect of the technology proposed herein achieved by a method of producing an acoustofluidic device according to the first aspect of the technology proposed herein, wherein the acoustofluidic device is to be used for performing an acoustophoretic operation at least at the resonance frequency of the individual cavity resonance, the method comprising the steps of:
  i. determining, by calculation or simulation, an impedance spectrum of the ultrasound transducer for each of a plurality of different combinations of parameter values of substrate parameters, ultrasound transducer parameters, and microfluidic cavity parameters, wherein:
    a. the substrate parameters comprise substrate material and substrate dimensions,
    b. the ultrasound transducer parameters comprise ultrasound transducer material and ultrasound transducer dimensions, and
    c. microfluidic cavity parameters comprise microfluidic cavity dimensions, fluid properties of a fluid in the microfluidic cavity, and microfluidic cavity position in the substrate,
  ii. determining for by calculation of simulation, a second set of natural acoustic cavity resonances for each of the plurality of different combinations of parameter values of substrate parameters, ultrasound transducer parameters, and microfluidic cavity parameters,
  iii. selecting, among the plurality of different combinations of parameter values of substrate parameters, ultrasound transducer parameters, and microfluidic cavity parameters:
    a. a substrate material SM and a set of substrate dimensions SM,
    b. an ultrasound transducer material UM and a set of ultrasound transducer dimensions UD, and
    c. a set of microfluidic cavity dimensions CD, a set of fluid properties CF of a fluid in the microfluidic cavity, and a microfluidic cavity position CP in the substrate,
  for which at least one individual cavity resonance of the second set of acoustic natural cavity resonances has a resonance frequency corresponding to the frequency of a minimum, preferably a local minimum, more preferably a global minimum in the corresponding impedance spectrum of the ultrasound transducer attached to, or in contact with, the substrate.
  iv. producing the acoustofluidic device having the substrate material SM and the substrate dimensions SD, and the ultrasound transducer material UM and the ultrasound transducer dimensions UD.

The acoustofluidic device may be used for performing an acoustophoretic operation at a plurality of resonance frequencies of a plurality of individual cavity resonances.

In the context of the present invention producing is to be understood as encompassing designing and/or constructing.

The calculation or simulation preferably comprises simulating the acoustic resonances in at least a two-dimensional, preferably a three-dimensional, model of the acoustofluidic device with fluid in the microfluidic cavity.

At least one of the abovementioned objects, or at least one of the further objects which will become evident from the below description, are according to a third aspect of the technology proposed herein achieved by a method of identifying a resonance frequency of an individual cavity resonance of an acoustofluidic device according to the first aspect of the technology proposed herein, the method comprising the steps of:
  i. driving the ultrasound transducer at a range of frequencies that spans over an expected resonance frequency of the microfluidic cavity,
  ii. obtaining an impedance spectrum by measuring the electrical impedance of the ultrasound transducer as it is driven at the range of frequencies, and
  iii. identifying the resonance frequency of the individual cavity resonance as a minimum, preferably a local minimum, more preferably a global minimum in the impedance spectrum.

By performing the method, the resonance frequency may be tracked and the frequency that the ultrasound transducer is driven at adjusted to increase the efficiency of an acoustofluidic operation performed with the acoustofluidic device.

The method may for example be performed one or more times before, during, or after the performing of an acoustofluidic operation.

The range of frequencies may extend from 50% to 150% of the expected resonance frequency. More preferably the range of frequencies may extend from 75% to 125% of the expected resonance frequency.

The expected frequency may be determined from the dimensions of the cavity and the speed of sound in the fluid intended to be provided in the cavity. The expected frequency may also be determined by manually adjusting the frequency until an efficient acoustofluidic operation is obtained. Where the method is performed more than one time, then the expected frequency may be a resonance frequency previously identified by the method.

At least one of the abovementioned objects, or at least one of the further objects which will become evident from the below description, are according to a fourth aspect of the technology proposed herein achieved by a method of performing an acoustofluidic operation, such as acoustic trapping of particles in a sample fluid, comprising the steps of,
  i. providing an acoustofluidic device according to the first aspect of the technology proposed herein,
  ii. providing a sample fluid in the cavity, and
  iii. actuating the ultrasound transducer at a resonance frequency of the individual cavity resonance.

By performing the method, the efficiency of the acoustofluidic operation is increased and/or maintained.

The method may further optionally comprise the step of controlling the temperature of the substrate.

Step (iii) may comprise actuating the ultrasound transducer at the resonance frequencies of several individual cavity resonances, of which one, or preferably all, have corresponding minima in the impedance spectrum.

Preferably the method further comprises the step of:
  iv. performing frequency tracking of the resonance frequency of the individual cavity resonance by performing the method according to the third aspect of the technology proposed herein to identify the resonance frequency of the individual cavity resonance used in step iii.

Steps (iii) and (iv) may be performed one or more times.

Preferably, step (iv) is performed repeatedly, or is performed after one or more of the following events have occurred:
a) a predetermined time interval has passed,
b) the temperature of the sample fluid has changed,
c) the composition of the sample fluid has changed,
d) the sample fluid has been replaced by another sample fluid,
e) a cleaning fluid has been provided in the cavity,
f) the drive signal to the ultrasound transducer has changed,
g) the temperature of the ultrasound transducer and/or the substrate has changed,
h) a user of the acoustofluidic operation has given a command,
i) an evaluating device has evaluated the result of the acoustofluidic operation and found the result to be inadequate when compared to a set value,
j) the ultrasound transducer has been attached to the substrate via the adhesive layer, or
k) the dampening material has been brought into contact with the substrate.

This is advantageous in that it provides for increasing or maintaining the efficiency of the acoustofluidic operation.

As for event (a), this is the preferred event for repeating steps (iii) and (iv). The predetermined time may range from 1 second to 10 minutes. By continuously repeating the steps (iii) and (iv) at predetermined intervals the resonance frequency is repeatedly identified so as to account for any change or drift in the resonance frequency (i.e., due to the other listed events (b)-(l).

As for event (b), the temperature of the sample fluid may for example be continuously or repeatedly measured by a temperature sensor or thermometer. Preferably event (b) is only considered to have occurred when the difference between a first temperature of the sample fluid and a further temperature of the sample fluid is greater than a set value, such as for example $1°$ C., more preferably $2°$ C.

As for event (c) the composition of the sample fluid comprises inter alia the concentration of any particles in the sample fluid, the identity of any particles in the sample fluid, and the properties of the sample fluid. The composition of the sample fluid may thus be determined inter alia by a spectrophotometer, a microscope and/or camera, a light sensitive array, an impedance sensor, a conductivity sensor. Preferably event (c) is only considered to have occurred when the composition has changed sufficiently so that a change in resonance frequency can be expected.

As for event (d), the change from one sample fluid to another may be detected by for example determining the composition of the sample fluid, as in event (c) above. Generally, if the steps (iii) and (iv) are performed repeatedly, the identified frequency will change in correspondence to the change in composition of the sample fluid as one sample fluid is displaced from the cavity by another sample fluid. This also applies to event (e).

The resonance frequency may also be identified for the cavity emptied of any fluid, i.e., event (f). The resonance frequency thus identified may for example be compared to an earlier resonance frequency determined for an empty cavity, in order to determine if the cavity indeed is empty, and/or if the acoustofluidic device has changed in any way, such as by being damaged, in need of service, etc.

As regards event (g), a change in drive signal, such as in frequency or voltage (amplitude), may also be used as a prompt to perform the steps (iii) and (iv).

As regards event (h) also the temperature of the transducer and or the substrate may be monitored, using a temperature sensor or thermometer, and any change, or only sufficiently large changes of $1°$ C., more preferably $2°$ C., be used to prompt the performing of the steps (iii)-(iv).

As regards event (i), a user may desire to identify the resonance frequency at any desired time.

As regards event (j), an evaluating device, such as a microscope with a camera and image recognition software, can be used to determine the result or efficiency of the acoustofluidic operation. Where the acoustofluidic operation comprises separating particles from the sample fluid, the efficiency of this separation may for example be determined by counting, using a microscope and camera, an impedance sensor, or a photocell detector, the number of particles that remain in the sample fluid after separation, thus providing a measure of the efficiency of the separation. The set value may for example correspond to a loss of efficiency of 1, 5 or 10% from the maximum value.

As regards event (k), this is useful where the substrate is attached to the ultrasound transducer by an adhesive tape or film, thus providing that the resonance frequency is identified if the substrate has been removed, or exchanged for another one, from the ultrasound transducer.

As regards event (l), this is useful where the dampening material may be brought into and out of contact with the substrate. The dampening material may for example be separate from the substrate and brought into contact with the substrate in when the acoustofluidic operation should be performed.

Each of the events (a) to (l) may further be detected when repeating steps (iii)-(iv) by evaluating changes in the impedance spectrum and the resonance. Specifically, each of the events (a) to (l) may lead to a change in the resonance frequency. By tracking the resonance frequency, these changes can be detected and/or quantified.

Further advantages with and features of the technology proposed herein will be apparent from the following detailed description of preferred embodiments.

BRIEF DESCRIPTION OF THE DRAWINGS AND DETAILED DESCRIPTION

A more complete understanding of the abovementioned and other features and advantages of the technology proposed herein will be apparent from the following detailed description of preferred embodiments in conjunction with the appended drawings, wherein:

FIG. 1A shows a cross sectional side view of an acoustofluidic device according to the first aspect of the technology proposed herein.

Figure 1B:
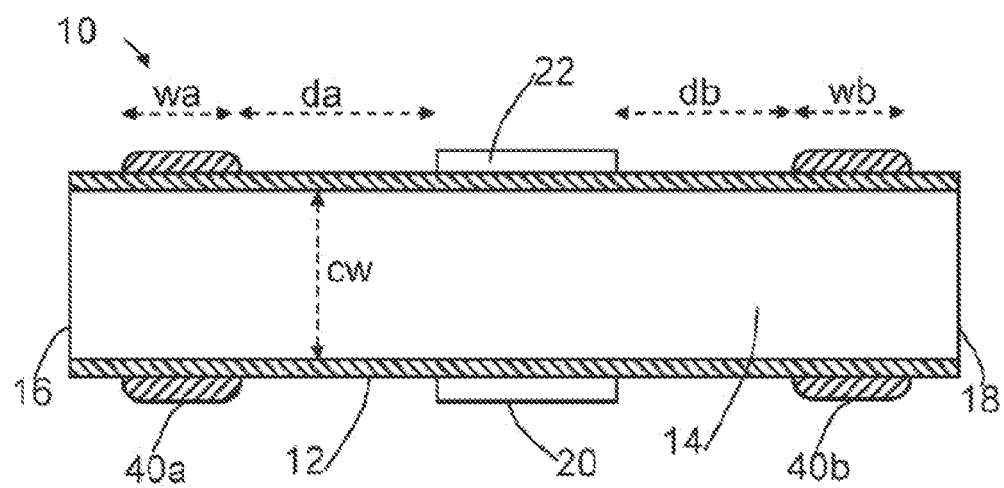
Figure 1C:
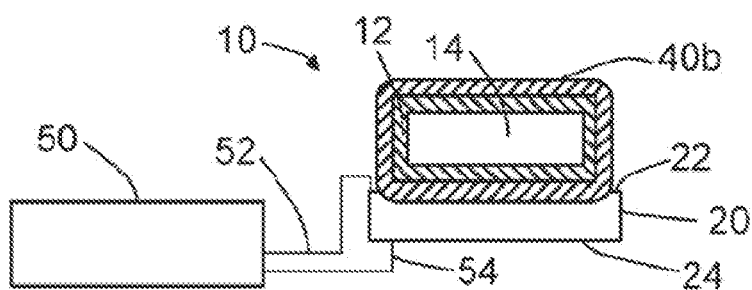
Figure 2A:
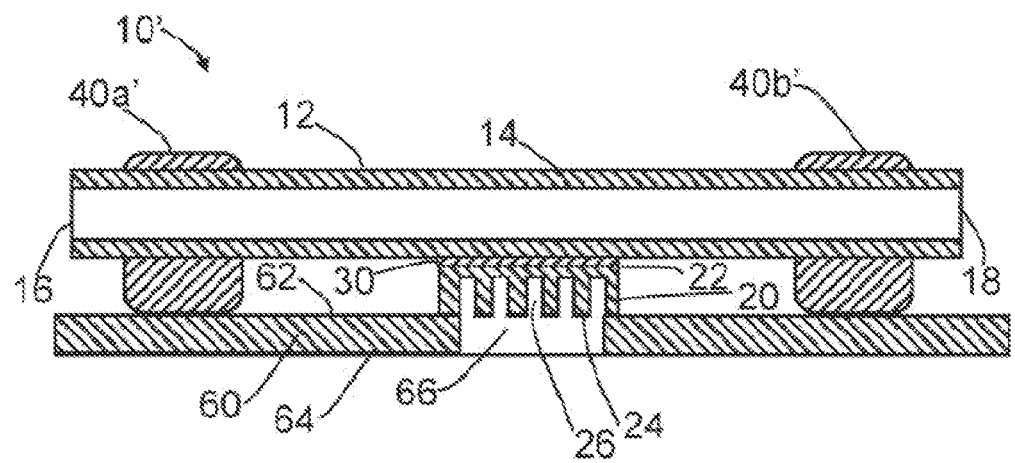
Figure 2B:
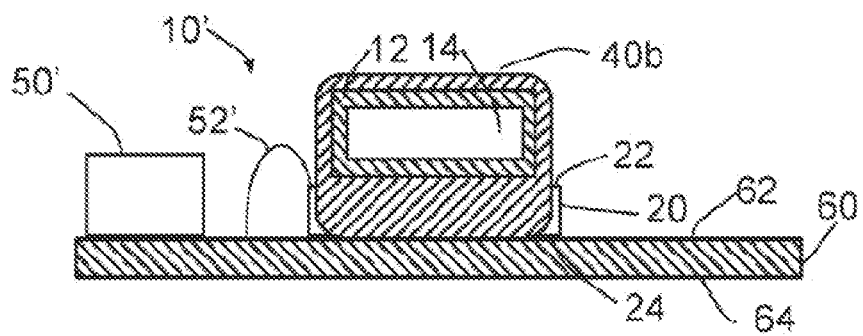
Figure 2C:
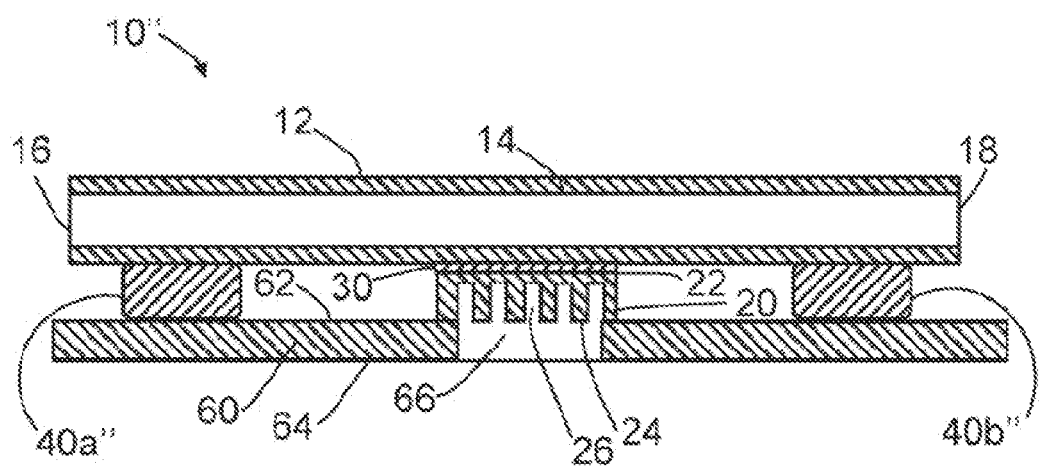
Figure 3A:
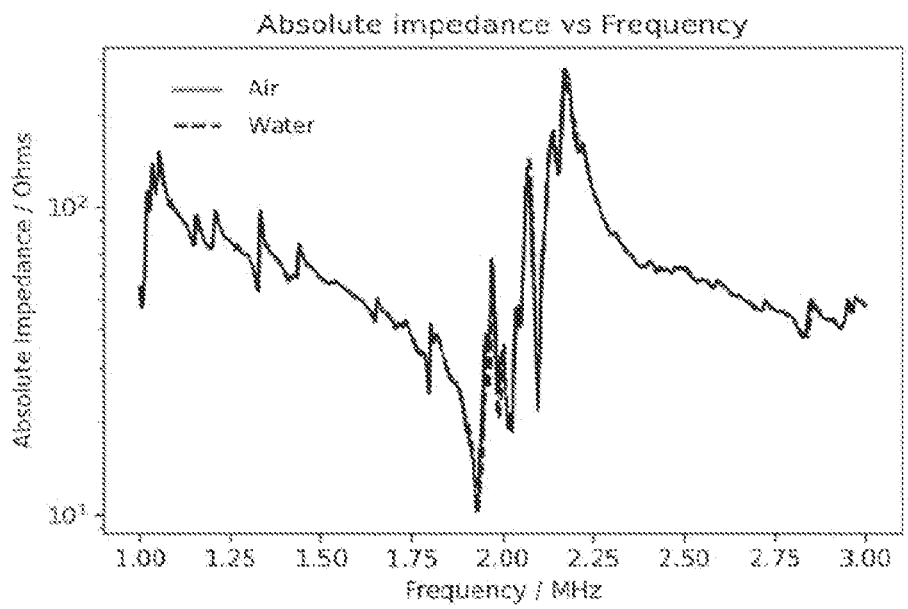
Figure 3B:
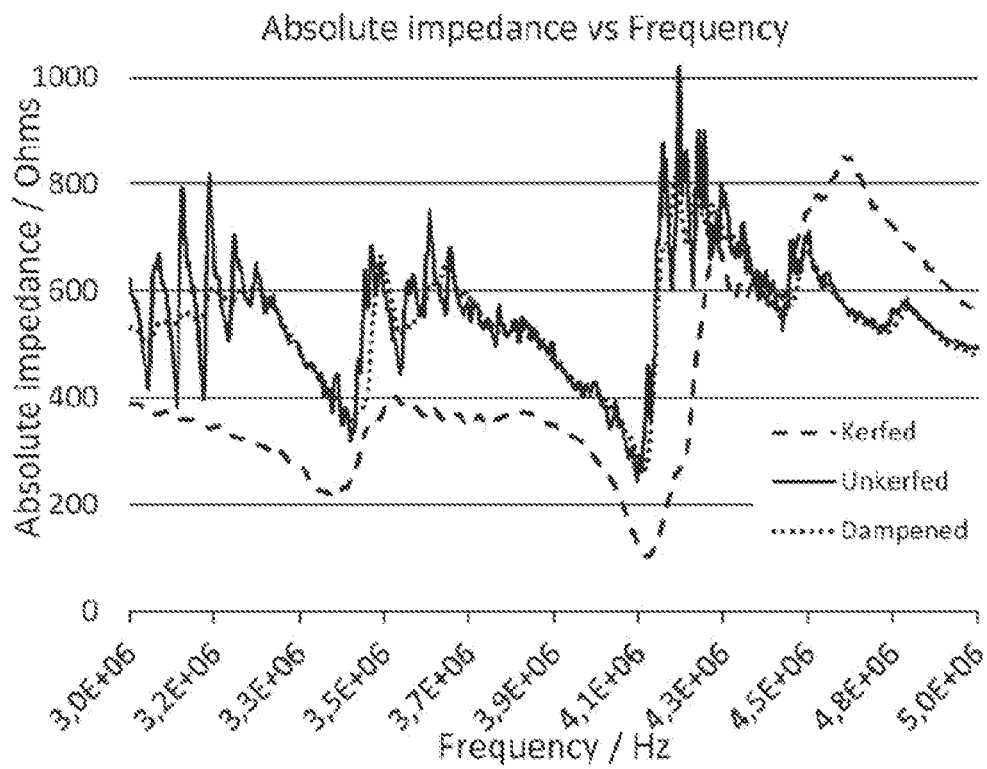
Figure 3C:
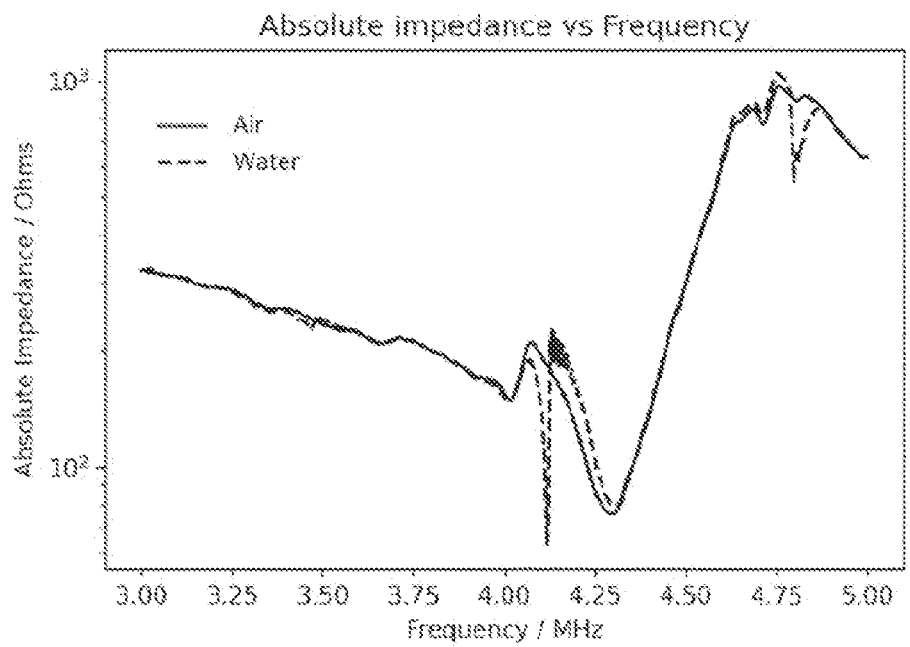
Figure 4A:
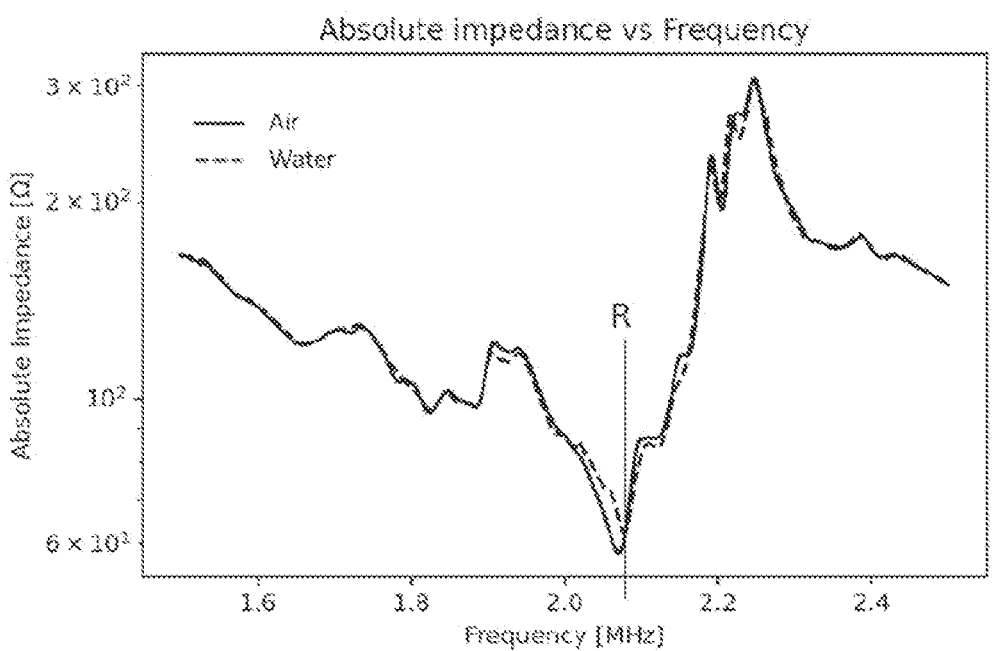
Figure 4B:
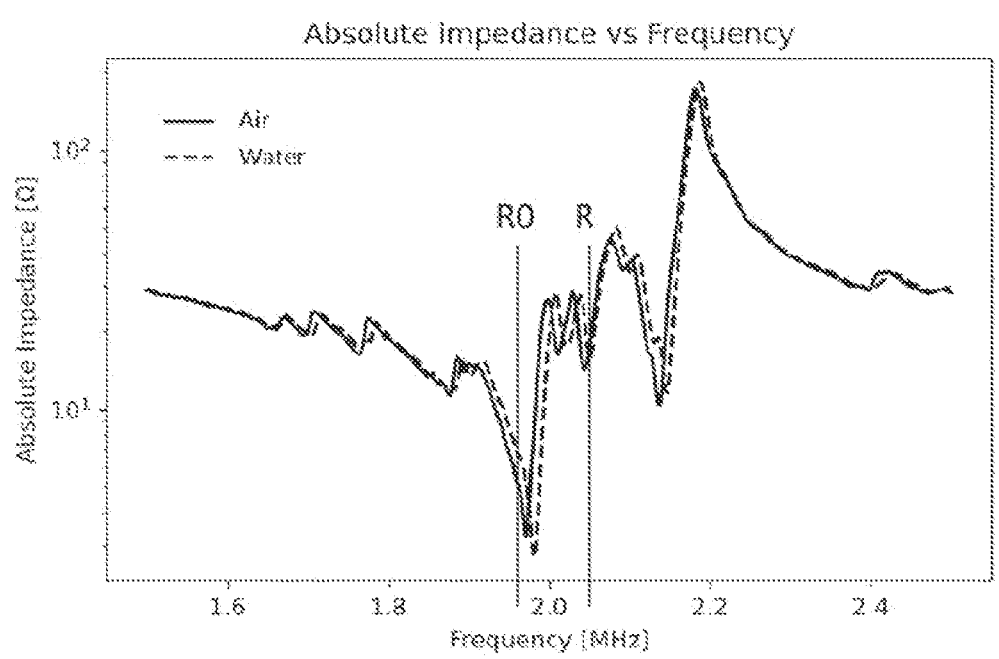

FIG. 1B shows a partial cross-sectional top view of the acoustofluidic device according to the first aspect of the technology proposed herein, FIG. 1C shows a partial cross-sectional end view of the acoustofluidic device according to the first aspect of the technology proposed herein, FIG. 2A shows a cross sectional side view of an alternative acoustofluidic device according to the first aspect of the technology proposed herein, the acoustofluidic device further comprising a printed circuit board or support onto which the ultrasound transducer is mounted, and with which the dampening material is in contact, FIG. 2B shows a partial cross sectional end view of the alternative acoustofluidic device according to the first aspect of the technology proposed herein, the acoustofluidic device further comprising a printed circuit board or support onto which the ultrasound transducer is mounted, and with which the dampening material is in contact, FIG. 2C shows a cross sectional side view of a further alternative acoustofluidic device according to the first aspect of the technology proposed herein, the acoustofluidic device further comprising a printed circuit board or support onto which the ultrasound transducer is mounted, and with which a minimal amount of dampening material is in contact with, FIG. 3A shows an impedance spectrum of an ultrasound transducer in a general acoustofluidic device comprising a channel filled with air or water, FIG. 3B shows an impedance spectrum of an ultrasound transducer in acoustofluidic devices according to the first aspect of the technology proposed herein, showing the effects of dampening material and grooves, respectively, FIG. 3C shows an impedance spectrum of an ultrasound transducer in a preferred acoustofluidic device according to the first aspect of the technology proposed herein, showing an impedance minimum enabling tracking of the resonance frequency of the microfluidic cavity, FIG. 4A shows an impedance spectrum of an ultrasound transducer in a different acoustofluidic device according to the first aspect of the technology proposed herein, showing an impedance minimum enabling tracking of the resonance frequency of the microfluidic cavity, and FIG. 4B shows an impedance spectrum of an ultrasound transducer in a further acoustofluidic device according to the first aspect of the technology proposed herein, showing an impedance minimum enabling tracking of the resonance frequency of the microfluidic cavity, In the figures and the description, the same reference numeral is used to refer to the same feature. A 'added to a reference numeral indicates that the feature so referenced has a similar function, structure or significance as the feature carrying the reference numeral without the', however not being identical with this feature.

FIG. 1A shows a cross sectional side view of an acoustofluidic device 10 according to the first aspect of the technology proposed herein. The acoustofluidic device 10 comprises a substrate 12, here represented by a capillary, comprising a microfluidic cavity 14, here represented by a channel having a channel height ch and a channel width cw (shown in FIG. 1B). The microfluidic cavity 14 comprises an inlet 16 and an outlet 18. An ultrasound transducer 20 having a first side 22 and a second side 24, the second side 24 being provided with a plurality of spaced apart parallel grooves 26 is attached to the substrate 12 by its first side 22 via an adhesive layer 30. First and second layers of dampening material 40a and 40b is provided so as to encircle the substrate 12 at positions spaced apart from each other and on opposite sides of the part of the cavity under which the ultrasound transducer 20 is attached.

In use a sample fluid, e.g., a solution comprising particles, is introduced into the microfluidic cavity 14. The ultrasound transducer 20 is driven by an electrical signal from a drive circuit (shown in FIG. 1C) applied over the first and second sides 22 and 24 by leads (shown in FIG. 1C) to cause vibrations of the ultrasound transducer 20. By virtue of the plurality of parallel grooves 26 the resulting vibration is mainly in the vertical direction. The vibrations are transferred from the ultrasound transducer into the microfluidic cavity 14 by the adhesive layer 30. This results in an acoustic wave in the microfluidic cavity 14 which may be used to trap or sort particles, i.e., to perform different types of acoustophoretic operations.

Despite the fact that ultrasound transducer 20 is attached to the substrate via adhesive layer 30, it is still possible to track the resonance frequency of the microfluidic cavity because the material and the dimensions of the substrate and the material and the dimensions of the ultrasound transducer are all selected so that at least one individual cavity resonance of the natural cavity resonances has a resonance frequency corresponding to the frequency of a minimum, preferably a local minimum, more preferably a global minimum, in an impedance spectrum of the ultrasound transducer attached to, or in contact with, the substrate. Such a minimum is seen in FIG. 3B as discussed further below.

Acoustofluidic device 10 comprises several optional and advantageous features for decreasing the resonance quality factor of at least one resonance of the first set of acoustic natural system resonances, to thereby dampen or remove at least one resonance of the first set of acoustic natural system resonances in order to further facilitate the tracking of the resonance frequency.

Accordingly, the parallel grooves 26 in the second side 24 of the ultrasound transducer 20 decreases vibration of the ultrasound transducer in the horizontal direction. This limits the number of resonances in the first set of system resonances.

Further, the dampening material 40a and 40b reduces vibrations in the substrate 12, thus further limiting and/or reducing the resonances in the first set of system resonances.

FIG. 1B shows a partial cross-sectional top view of the acoustofluidic device 10 according to the first aspect of the technology proposed herein. In this view it can be seen that the ultrasound transducer 20 is preferably dimensioned so that a part of the first side 22 thereof extends beyond the substrate 12. This allows for attaching leads, needed for supplying an electric drive signal to the ultrasound transducer 20, one lead to the first side 22 and a second lead to the second side 24.

It can also be seen that the dampening material 40a and 40b, respectively, forms bands or collars encircling the substrate 12. The greater the extent of the substrate 12 that is covered by the dampening material 40a and 40b, the greater the dampening.

Thus, the width wa and wb of the respective dampening layers 40a and 40b may be varied. Also, the respective distances da and db between the outer edges of the dampening material 40a and 40b and the ultrasound transducer 20 may be varied.

FIG. 1C shows a partial cross-sectional end view of the acoustofluidic device 10 according to the first aspect of the technology proposed herein. In this figure it is also seen that the dampening material 40a and 40b forms bands or collars encircling the substrate 12. It is further shown that the microfluidic cavity 14 has a rectangular cross section.

FIG. 1C further schematically shows a drive circuit 50 providing a drive signal and being connected to the ultrasound transducer 20 via ground lead 52 connected to the first side 22 and via signal lead 54 connected to the second side 24 of the ultrasound transducer 20.

FIG. 2A shows a cross sectional side view of an alternative acoustofluidic device 10' according to the first aspect of the technology proposed herein, the acoustofluidic device 10' further comprising a printed circuit board or support 60 onto which first side 62 the ultrasound transducer 20 is mounted, and onto which the dampening material 40a' and 40b', here modified to extend the thickness thereof towards the first side 62, in contact, (here attached) for further dampening or leading off unwanted vibration and resonance in the substrate 12 into the printed circuit board 60. The attachment of the dampening material 40a' and 40b' to the printed circuit board 60 further increases the robustness and rigidity of the substrate 12, thus protecting the substrate 12 from damage such as damage and breaks caused bending and/or twisting and/or other forces being applied to the substrate 12.

To further reduce unwanted vibration and resonance the printed circuit board 60 is advantageously provided with a cutout 66 extending from the first side 62 to a second side 64 and providing an air-backing of the ultrasound transducer 20, whereby a major part of the second side 24 of the ultrasound transducer 20 is not in contact with the printed circuit board. This allows a freer vibration of the ultrasound transducer 20 in the direction of the height ch of the cavity or channel 14, thus further facilitating vibration in that direction and providing a simpler impedance spectrum. This further limits the number of resonances in the first set of system resonances.

FIG. 2B shows a partial cross-sectional end view of the alternative acoustofluidic device 10' according to the first aspect of the technology proposed herein.

Also shown is a modified drive circuit 52, now being mounted on the first side 62 of the printed circuit board 60, and connected to the first side 22 of the ultrasound transducer 20 by a lead in the printed circuit board (not shown) and by signal lead 52', and to the second side 24 via a ground lead provided in the printed circuit board (not shown).

FIG. 2C shows a cross sectional side view of a further alternative acoustofluidic device 10" according to the first aspect of the technology proposed herein, the acoustofluidic device further comprising the printed circuit board or support 60 onto which the ultrasound transducer is mounted, and onto which a minimal amount of dampening material 40a" and 40b" is attached to, FIG. 3A shows an impedance spectrum of an ultrasound transducer in a general acoustofluidic device comprising a channel filled with air or water. FIG. 3A thus shows the impedance for an acoustofluidic device comprising a 2 MHz transducer and a larger glass substrate. The ultrasound transducer was attached to the substrate using an adhesive. The cavity resonance frequency was determined experimentally as being 2.033 MHz. The channel resonance frequency at 2.033 MHz however do not have a corresponding minimum in the impedance spectra, as shown by the figure. This is especially clear when considering that the spectra for air-filled and water filled channel are almost identical. This means that the introduction of water into the channel, which water has a speed of sound that differs significantly from that of air, does not result in any clear difference in the spectra. Thus, despite the fact that experiments have shown that this acoustofluidic device indeed has a channel resonance frequency at 2.033 MHz, which channel resonance can be used to perform an acoustofluidic operation, this channel resonance does not give rise to a detectable minimum in the impedance spectra. Accordingly, it is not possible to track the channel resonance frequency 2.033 MHz using an impedance spectrum of this system. The substrate had outer dimensions of 45 mm length, 5 mm width, 1.4 mm thickness (height). The inner channel had 420 μm width and 150 μm height. The transducer had the dimensions 8×24 mm². The transducer was not provided with parallel groves, nor was a dampening material attached to the substrate.

FIG. 3B shows an impedance spectrum of an ultrasound transducer in acoustofluidic devices according to the first aspect of the technology proposed herein, showing the effects of dampening material and grooves (kerfing), respectively. The acoustofluidic device used is similar to that shown in FIG. 1A.

Here the dimensions and materials of the transducer and substrate, the substrate being a capillary, and the dimensions of the channel, have been selected so that the channel resonance at 4.1 MHz is detectable, as it corresponds to a minimum, here a global minimum, in the impedance spectrum, see line designated "Unkerfed".

The addition of grooves to the second side of the ultrasound transducer (called kerfing) is shown to smooth out the impedance spectrum, see line designated "Kerfed".

Alternatively, the addition of a dampening material to the substrate also smooths out the impedance spectrum, see line designated "Dampened".

Although it is possible to track the resonance frequency of the acoustofluidic device without configuring the device with grooves (kerfing) and dampening material, it is preferably to do so to smooth out the impedance spectrum, as shown in FIG. 3C.

FIG. 3C thus shows an impedance spectrum of an ultrasound transducer in a preferred acoustofluidic device according to the first aspect of the technology proposed herein, showing an impedance minimum enabling tracking of the resonance frequency of the microfluidic cavity. Here the dimensions and materials of the transducer and substrate, the substrate being a capillary, and the dimensions of the channel, have been selected so that the channel resonance at 4.1 MHz is detectable, as it corresponds to a minimum, here a global minimum, in the impedance spectrum.

This minimum is also discernible from the minimum at 4.30 MHz corresponding to another resonance of the system. Further, the inherent resonance of the transducer alone is 4 MHz, and it can be concluded that the resonance frequency of the channel differs from that of the transducer. The resonance at 4.1 MHz can thus be tracked if, and as, the resonance frequency of the channel resonance changes due to changing temperature and content of the fluid in the channel. The acoustofluidic device used to obtain the impedance spectrum corresponded to the device 10 shown in FIG. 1A. The channel had a width of 2 mm, a height of 1 mm, and a length of 25 mm. The wall thickness of the capillary was 0.25 mm. The dimensions of the ultrasound transducer were 3.5×1.55 mm². The ultrasound transducer was attached to the capillary by an adhesive and the transducer was further provided with spaced apart parallel grooves on the side not attached to the capillary. A dampening material in the form of a cured adhesive was attached to the outer surface of the capillary on both side of the position of the ultrasound transducer.

FIG. 4A shows an impedance spectrum of an ultrasound transducer in a different acoustofluidic device according to the first aspect of the technology proposed herein, showing an impedance minimum enabling tracking of the resonance frequency of the microfluidic cavity. As shown in FIG. 4A by the vertical line marked R, the impedance spectrum exhibits a local and global minima at 2.07 MHz that is useable for tracking. The acoustofluidic device used to obtain the impedance spectrum was similar to the device 10' shown in FIG. 2A and configured as a thick-walled capillary with rectangular cross section. The substrate had outer dimensions of 10×3×1.5 mm³ and the channel, which extended along the full length (10 mm) of the substrate, had a rectangular cross section of 1.0×0.5 mm². The ultrasound transducer was mounted on a printed circuit board and the substrate was attached to the ultrasound transducer using an adhesive. The ultrasound transducer had an inherent resonance frequency of 2 MHz, and as seen the channel resonance at 2.07 MHz differed from the inherent resonance of the ultrasound transducer. The ultrasound transducer was not provided with kerfing.

FIG. 4B shows an impedance spectrum of an ultrasound transducer in a further acoustofluidic device according to the first aspect of the technology proposed herein, showing an impedance minimum enabling tracking of the resonance frequency of the microfluidic cavity, As shown in FIG. 4B by the vertical line R, the impedance spectrum exhibits a local minimum at 2.05 MHz which can be tracked. A further cavity resonance indicated by vertical line marked RO was experimentally found at 1.97 MHz, but the corresponding minima could not be identified in the impedance spectrum as it is overlaps with the inherent transducer resonance at 2 MHz. The substrate was configured as a glass chip having outer dimensions of 45×5×1.5 mm and featuring a flow channel having dimensions of 30×0.5×0.2 mm (rectangular cross section) centrally arranged in the substrate and being preceded and followed by flow splitters comprising, at one end of the substrate, two separate inlet channels extending perpendicularly from opposite longitudinal sides of the substrate to a first end of the flow channel, and at the opposite end of the substrate, two separate outlet channels extending perpendicularly and in opposite directions from the second end of the flow channel to opposite longitudinal sides of the substrate. The ultrasound transducer was attached to a printed circuit board and the substrate was attached to the ultrasound transducer using an adhesive. The ultrasound transducer had an inherent resonance frequency of 2 MHz, and was not provided with kerfing.

In summary of the above, FIGS. 3C and 4A-4B show impedance spectra from acoustofluidic devices according to the first aspect of the technology proposed herein as compared to FIG. 3A showing an impedance spectrum from an acoustofluidic device not according to the first aspect of the technology proposed herein. The properties of the respective acoustofluidic devices are summarized in the table below:

In contrast, FIG. 3A has a 0.033 MHz difference between the cavity resonance and the inherent transducer resonance, corresponding to a difference of 1.65%. The further cavity resonance at 1.97 MHz in FIG. 4B has a difference of 0.03 (2−1.97) which corresponds to 1.5%. Neither of these allow tracking.

The table shows that tracking is possible with or without kerfing, and with or without dampening. The table further shows that acoustofluidic devices according to the first aspect of the technology proposed herein may be produced in different configurations including capillaries with relatively thin or thick walls, as well as the general chip format comprising an elongated rectangular substrate including a cavity with multiple inlets and outlets. Also, different ultrasound transducers with different inherent resonance frequencies can be used.

Generally, in order to construct acoustofluidic devices according to the first aspect of the technology proposed herein, the method according to the second aspect of the technology proposed herein as described above may be performed.

In a simple implementation a method of producing the acoustofluidic device may comprise steps of:
  selecting and noting a resonance frequency of a given ultrasound transducer.
  calculating at least one microfluidic cavity dimension corresponding to an integer number of half wavelengths corresponding to the resonance frequency and taking into account the speed of sound in a fluid provided in the cavity,
  increasing or decreasing the calculated at least one cavity dimension by an amount corresponding to at least 2.5% of the resonance frequency to obtain a modified cavity dimension,
  providing a substrate having a microfluidic cavity with the modified cavity dimension, and

| Spectrum/ device type | Outer dimensions (L × W × H) | Cavity dimensions (L × W × H) | Inherent transducer resonance | Tracking possible (resonance) (difference) |
|---|---|---|---|---|
| FIG. 3A Chip with channel | 45 × 5 × 1.4 mm³ | 45 × 0.42 × 0.15 mm³ | 2 MHz | No (2.033 MHz) (1.65%) |
| FIG. 3C Thin-walled capillary | 25 × 2.5 × 1.5 mm³ | 25 × 2 × 1 mm³ | 4 MHz | Yes (4.1 MHz) (2.5%) Yes (4.30 MHz) (7.5%) |
| FIG. 4A Thick-walled capillary | 10 × 3 × 1.5 mm³ | 10 × 1 × 0.5 mm³ | 2 MHz | Yes (2.07) (3.5%) |
| FIG. 4B Chip with channel having multiple inlets and outlets | 45 × 5 × 1.5 mm³ | 30 × 0.5 × 0.2 mm³ | 2 MHz | Yes (2.05) (2.5%) No (1.97) (1.5%) |

Accordingly, from the table it can be seen that a difference of at least 2.5% between the inherent transducer resonance and the cavity resonance allows tracking to be performed. 2.5% corresponds to the 0.05 MHz difference between 2.05 MHz and 2 MHz (FIG. 4B), and to the 0.1 MHz difference between 4.1 and 4 MHz (FIG. 3C). The further cavity resonance in FIG. 3C at 4.30 MHz has a difference of 0.30 MHz corresponding to 7.5% difference. Additionally, the cavity resonance at 2.07 MHz differs by 3.5% from the inherent transducer resonance 2 MHz (FIG. 4A). All of these resonances allow tracking.

attaching or contacting an ultrasound transducer to or with the substrate.

To further enhance the tracking properties of the acoustofluidic device, a dampening material may be attached to the substrate as discussed above, and/or the ultrasound transducer may be provided with kerfing as discussed above. Additionally, the outer dimensions of the substrate may be selected so as to not have any resonance frequency corresponding to the resonance frequency of the modified cavity dimension. It should thus be noted that manufacturing the acoustofluidic device such that there is a difference of at least 2.5% in resonance frequency between at least one cavity resonance frequency and the inherent resonance frequencies of the ultrasound transducer is just one simple way of obtaining acoustofluidic devices according to the first aspect of the technology proposed herein. The acoustofluidic device may in particular be manufactured according to the method according to the second aspect of the technology proposed herein.

As long as the material and the dimensions of the substrate and the material and the dimensions of the ultrasound transducer are all selected so that at least one individual cavity resonance of the second set of acoustic natural cavity resonances has a resonance frequency corresponding to the frequency of a minimum, preferably a local minimum, more preferably a global minimum, in an impedance spectrum of the ultrasound transducer attached to, or in contact with, the substrate, tracking is possible.

Acoustofluidic devices according to the first aspect of the present invention may thus encompass such devices where the difference in resonance frequency between at least one cavity resonance frequency and the inherent resonance frequencies of the ultrasound transducer is less than 2.5%.

This applies for example when at least one individual cavity resonance of the second set of acoustic natural cavity resonances has:
a resonance quality factor that is larger than the resonance quality factor of the system resonance, of the first set of acoustic natural system resonances, that has the closest resonance frequency to the resonance frequency of the at least one individual cavity resonance, and preferably,
a resonance quality factor that is larger than the resonance quality factors of each of the system resonances of the first set of acoustic natural system resonances.

In these cases the at least one individual cavity resonance is more prominent than the resonances of the first set of acoustic natural system resonances, and which is therefore discernible as a minimum in the impedance spectrum of the ultrasound transducer.

Feasible Modifications

The technology proposed herein is not limited only to the embodiments described above and shown in the drawings, which primarily have an illustrative and exemplifying purpose. This patent application is intended to cover all adjustments and variants of the preferred embodiments described herein, thus the present invention is defined by the wording of the appended claims and the equivalents thereof.

Throughout this specification and the claims which follows, unless the context requires otherwise, the word "comprise", and variations such as "comprises" or "comprising", will be understood to imply the inclusion of a stated integer or steps or group of integers or steps but not the exclusion of any other integer or step or group of integers or steps.

The invention claimed is:

1. An acoustofluidic device, comprising:
   a substrate having a microfluidic cavity defined therein, the microfluidic cavity being configured to contain a fluid; and
   an ultrasound transducer in direct acoustical contact with the substrate, wherein the substrate and the ultrasound transducer combined have a set of acoustic natural system resonances determined by the material and the dimensions of the substrate and the material and the dimensions of the ultrasound transducer, each of the acoustic natural system resonances having a system resonance frequency and a system resonance quality factor;
   wherein the microfluidic cavity, when containing a fluid, has a set of acoustic natural cavity resonances determined by the dimensions of the cavity and the speed of sound in the fluid, each of the acoustic natural cavity resonances having a cavity resonance frequency and a cavity resonance quality factor; and
   wherein the material and the dimensions of the substrate and the material and the dimensions of the ultrasound transducer are all configured so that at least one individual acoustic natural cavity resonance has a cavity resonance frequency corresponding to the frequency of a minimum in an impedance spectrum of the ultrasound transducer in contact with the substrate.

2. The acoustofluidic device according to claim 1, wherein the microfluidic cavity has a length dimension, a width dimension, and a height dimension, and wherein the set of acoustic natural cavity resonances includes an acoustic natural cavity resonance in at least one of the length dimension, the width dimension, and the height dimension.

3. The acoustofluidic device according to claim 1, wherein at least one individual acoustic natural cavity resonance includes at least one of:
   a cavity resonance frequency that is different from each of the system resonance frequencies; and
   a cavity resonance quality factor that is larger than the system resonance quality factor of the acoustic natural system resonance that has a system resonance frequency that is closest to the cavity resonance frequency of the at least one individual acoustic natural cavity resonance; and
   a cavity resonance quality factor that is larger than the system resonance quality factor of each of the acoustic natural system resonances.

4. The acoustofluidic device according to claim 3, wherein the material and the dimensions of the substrate and the material and the dimensions of the ultrasound transducer are all configured so that the cavity resonance quality factor of the at least one individual cavity resonance is at least 25% larger than (i) the system resonance quality factor of the acoustic natural system resonance that has the system resonance frequency that is closest to the cavity resonance frequency of the at least one individual acoustic natural cavity resonance; or (ii) the system resonance quality factor of each of the acoustic natural system resonances.

5. The acoustofluidic device according to claim 1, wherein the acoustofluidic device is configured for decreasing the system resonance quality factor of at least one acoustic natural system resonance, to thereby at least damp at least one acoustic natural system resonance of the set of acoustic natural system resonances.

6. The acoustofluidic device according to claim 1, further comprising:
   a dampening material in contact with at least a part of the substrate and configured for decreasing the system resonance quality factor of at least one acoustic natural system resonance of the set of acoustic natural system resonances, to thereby at least damp at least one acoustic natural system resonance of the set of acoustic natural system resonances, the dampening material comprising a dimensionally stable polymeric material.

7. The acoustofluidic device according to claim 6, wherein the dampening material is selected from the group consisting of a cured adhesive, a rubber, a silicone, and a polyurethane.

8. The acoustofluidic device according to claim 1, wherein the ultrasound transducer has first and second sides, the device further comprising:

a support surface to which the ultrasound transducer is attached via a first portion of the second side, wherein a second portion of the second side of the ultrasound transducer is not in contact with the support surface.

9. The acoustofluidic device according to claim 6, further comprising a support surface to which the transducer is attached, wherein at least a part of the dampening material is in contact with the support surface.

10. The acoustofluidic device according to claim 1, wherein the ultrasound transducer has a height dimension extending from a first side in contact with the substrate to an opposite second side, and wherein the ultrasound transducer is configured such that a transducer resonance quality factor for at least one acoustic natural transducer resonance in the height dimension is larger than a transducer resonance quality factor for at least one acoustic natural transducer resonance in one of a width dimension and a length dimension of the ultrasound transducer.

11. The acoustofluidic device according to claim 10, wherein the second side of the ultrasound transducer includes a plurality of parallel grooves configured for reducing the transducer resonance quality factor for at least one acoustic natural transducer resonance in at least one of the width dimension and the length dimension of the ultrasound transducer.

12. The acoustofluidic device according to claim 1, wherein the ultrasound transducer is attached to the substrate via an adhesive layer.

13. The acoustofluidic device of claim 12, wherein the adhesive is a non-resonance dampening adhesive.

14. The acoustofluidic device according to claim 1, wherein the transducer has a set of acoustic natural transducer resonances determined by the material and dimensions of the ultrasound transducer, each of the acoustic natural transducer resonances comprising a transducer resonance frequency and a transducer resonance quality factor, and wherein at least one individual cavity resonance of the set of acoustic natural cavity resonances has a cavity resonance frequency that is different from each of the transducer resonance frequencies of the set of acoustic natural transducer resonances.

15. The acoustofluidic device according to claim 14, wherein the difference between the cavity resonance frequency of the at least one individual acoustic natural cavity resonance of the set of acoustic natural cavity resonances and each of the transducer resonance frequencies of the set of acoustic natural transducer resonances is at least 2.5% of the transducer resonance frequencies of the set of acoustic natural transducer resonances.

16. A method of producing an acoustofluidic device for performing an acoustophoretic operation, the method comprising the steps of:
(a) determining an impedance spectrum of the ultrasound transducer for each of a plurality of different combinations of parameter values of substrate parameters, ultrasound transducer parameters, and microfluidic cavity parameters, wherein:
  (1) the substrate parameters comprise substrate material and substrate dimensions;
  (2) the ultrasound transducer parameters comprise ultrasound transducer material and ultrasound transducer dimensions; and
  (3) the microfluidic cavity parameters comprise microfluidic cavity dimensions, fluid properties of a fluid to be contained in the microfluidic cavity, and microfluidic cavity position in the substrate;

(b) determining a set of natural acoustic cavity resonances for each of the plurality of different combinations of parameter values of the substrate parameters, the ultrasound transducer parameters, and the microfluidic cavity parameters;
(c) selecting, among the plurality of different combinations of the parameter values of the substrate parameters, the ultrasound transducer parameters, and the microfluidic cavity parameters:
  (4) a substrate material SM and a set of substrate dimensions SD;
  (5) an ultrasound transducer material UM and a set of ultrasound transducer dimensions UD; and
  (6) a set of microfluidic cavity dimensions CD, a set of fluid properties CF of a fluid to be contained in the microfluidic cavity, and a microfluidic cavity position CP in the substrate;
for which at least one individual acoustic natural cavity resonance of the set of acoustic natural cavity resonances has a cavity resonance frequency corresponding to the frequency of a minimum in the corresponding impedance spectrum of the ultrasound transducer when it is in contact with the substrate;
(d) selecting a substrate comprising the substrate material SM and having the substrate dimensions SD, and selecting an ultrasound transducer comprising the ultrasound transducer material UM and having the ultrasound transducer dimensions UD;
(e) forming, at the microfluidic cavity position CP in the selected substrate, a microfluidic cavity in the substrate having the microfluidic cavity dimensions CD; and
(f) placing the selected ultrasound transducer in direct acoustical contact with the selected substrate.

17. A method of identifying a resonance frequency of an individual acoustic natural cavity resonance of an acoustofluidic device in accordance with claim 1, the method comprising the steps of:
  i. driving the ultrasound transducer at a range of frequencies that spans over an expected cavity resonance frequency of the microfluidic cavity;
  ii. obtaining an impedance spectrum by measuring the electrical impedance of the ultrasound transducer as it is driven at the range of frequencies; and
  iii. identifying the cavity resonance frequency of the individual acoustic natural cavity resonance as a minimum in the impedance spectrum.

18. A method of performing an acoustofluidic operation using the device in accordance with claim 1, the method comprising the steps of:
  i. providing a fluid in the microfluidic cavity; and
  ii. actuating the ultrasound transducer at a cavity resonance frequency of the at least one individual acoustic natural cavity resonance.

19. The method according to claim 18, further comprising the step of performing frequency tracking of the cavity resonance frequency of the at least one individual acoustic natural cavity resonance to identify the cavity resonance frequency of the at least one individual acoustic natural cavity resonance, the frequency tracking being performed by (1) driving the ultrasound transducer at a range of frequencies that spans over an expected cavity resonance frequency of the microfluidic cavity; (2) obtaining an impedance spectrum by measuring the electrical impedance of the ultrasound transducer as it is driven at the range of frequencies; and (3) identifying the cavity resonance frequency of the individual acoustic natural cavity resonance as a minimum in the impedance spectrum.

20. The method according to claim 19, wherein step of frequency tracking is performed after one or more of the following events have occurred:
   a) a predetermined time interval has passed;
   b) the temperature of the fluid has changed;
   c) the composition of the fluid has changed;
   d) the fluid has been replaced by another fluid;
   e) a cleaning fluid has been provided in the cavity;
   f) the drive signal to the ultrasound transducer has changed;
   g) the temperature of at least one of the ultrasound transducer and the substrate has changed;
   h) a user command to perform the step of frequency tracking has been received by the device;
   i) the result of the acoustofluidic operation is determined to be inadequate when compared to a set value;
   j) the ultrasound transducer has been attached to the substrate via an adhesive layer; and
   k) the dampening material has been brought into contact with the substrate.

* * * * *